No. 863,341. PATENTED AUG. 13, 1907.
E. T. ALBER.
TRANSMISSION MECHANISM.
APPLICATION FILED DEC. 20, 1906.
2 SHEETS—SHEET 1.
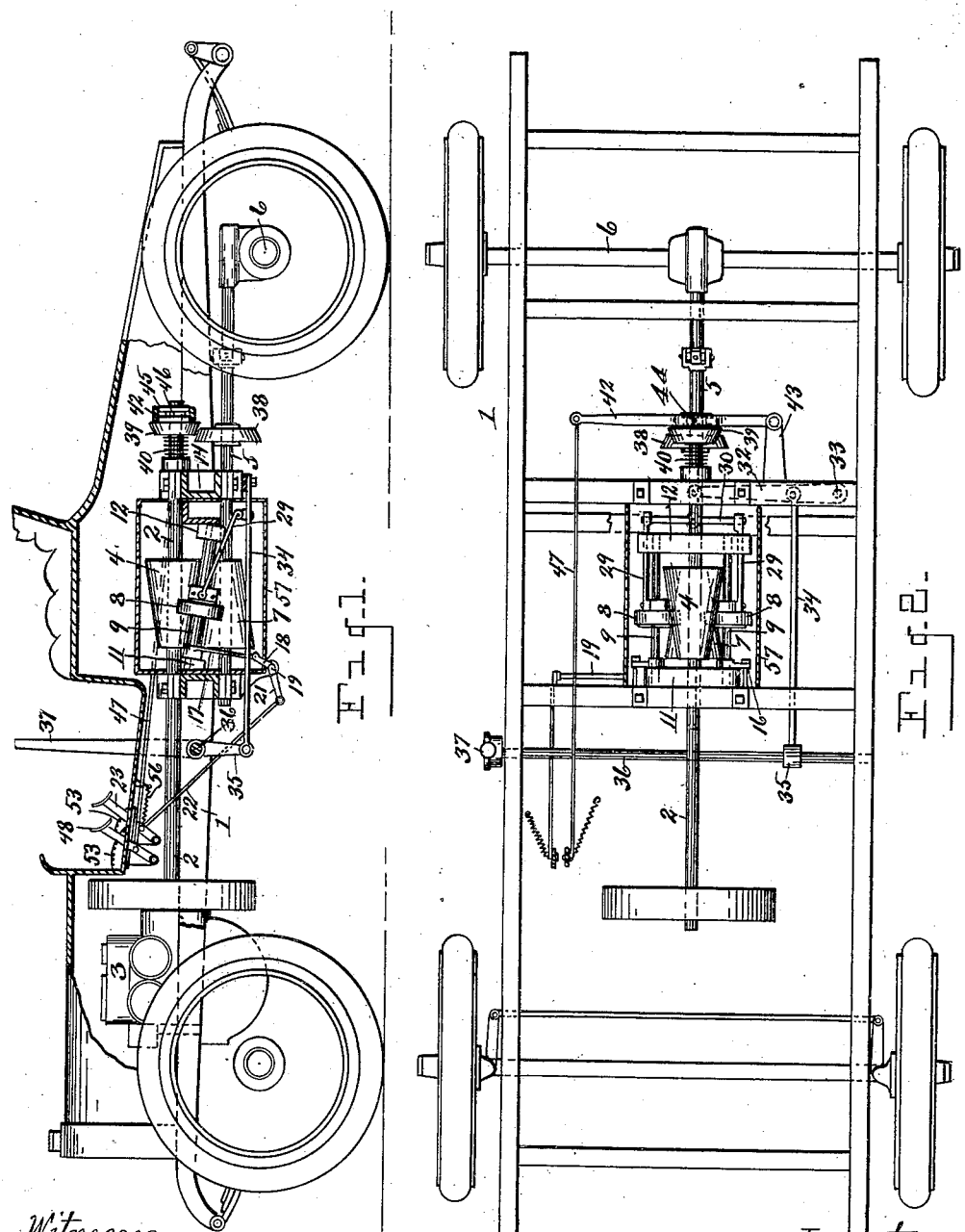
Witnesses.
O. B. Baenziger
J. G. Howlett
Inventor.
Erhard T. Alber.
By E. A. Wheeler & Co. Attys.

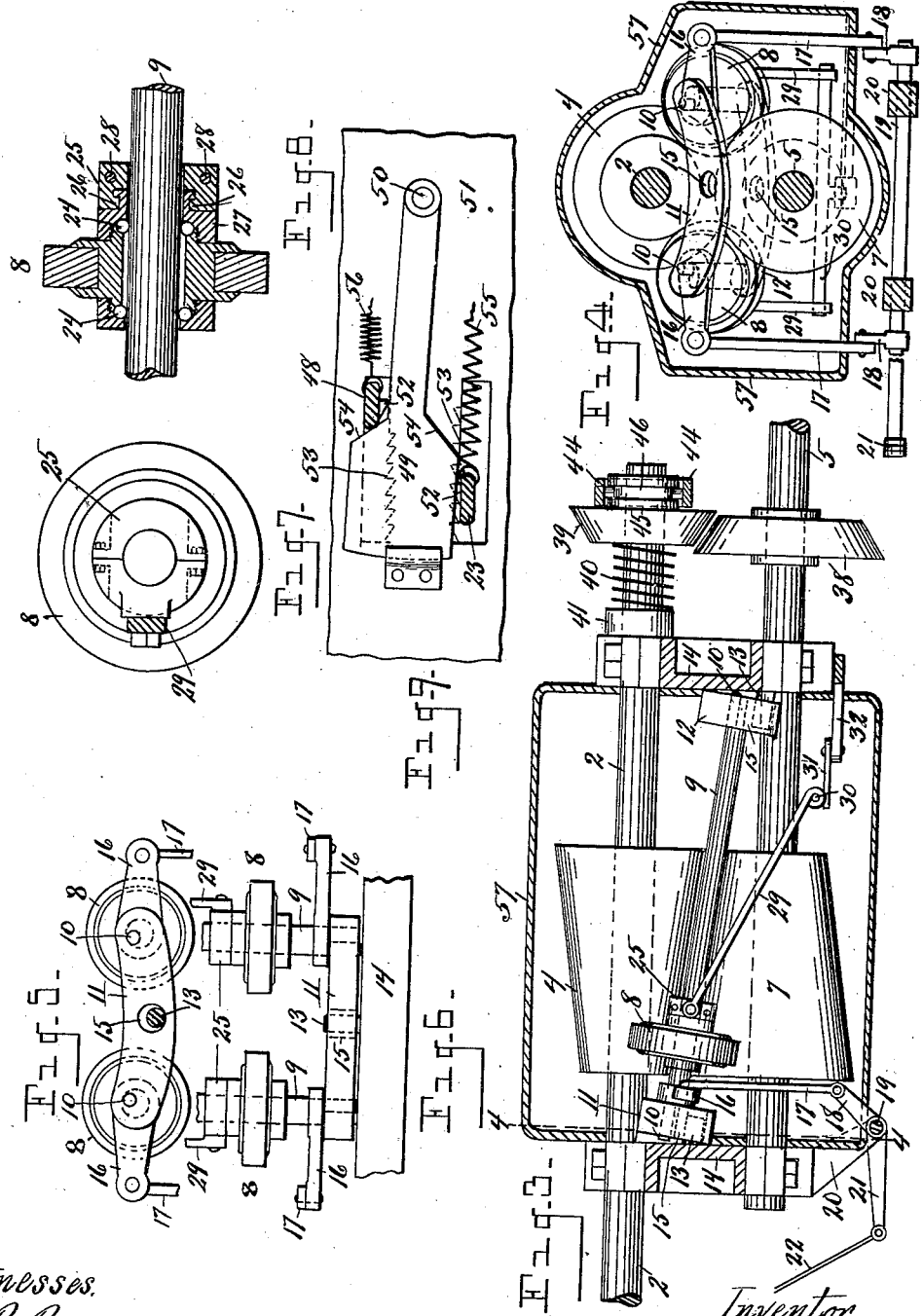

UNITED STATES PATENT OFFICE.

ERHARD T. ALBER, OF ANN ARBOR, MICHIGAN.

TRANSMISSION MECHANISM.

No. 863,341.  Specification of Letters Patent.  Patented Aug. 13, 1907.

Application filed December 20, 1906. Serial No. 348,695.

*To all whom it may concern:*

Be it known that I, ERHARD T. ALBER, a citizen of the United States, residing at Ann Arbor, in the county of Washtenaw, State of Michigan, have invented certain new and useful Improvements in Transmission Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to frictional transmission mechanism, especially designed for use in connection with the propulsion of motor vehicles, and consists in the construction and arrangement of parts hereinafter more fully set forth and pointed out particularly in the claims.

The objects of the invention are to provide a transmission mechanism of simple, compact and comparatively inexpensive construction, wherein the arrangement is such as to enable the vehicle to be driven at any desired rate of speed; to provide for readily changing from one speed to another; to obviate the noise and rattle incident to the employment of the ordinary transmission mechanism, and to provide for reversing the direction of the driven shaft at will. The above objects are attained by the mechanism illustrated in the accompanying drawings, in which:—

Figure 1 is a side elevation with parts broken away, and other parts in section, showing one embodiment of my invention as applied in the propulsion of a motor vehicle. Fig. 2 is a plan view of Fig. 1 with the body portion and hood removed and the engine omitted.
Fig. 3 is an enlarged view of the frictional transmission mechanism, the casing in which said mechanism is mounted appearing in longitudinal vertical section. Fig. 4 is a transverse section as on line 4—4 of Fig. 3. Fig. 5 is a fragmentary view in elevation of the transmitting rollers and the bearing plate in which the shafts of said rollers are eccentrically journaled. Fig. 6 is a plan view of Fig. 5 showing the manner of loosely supporting said bearing plate from the frame. Fig. 7 is an elevation of one of the transmitting rollers. Fig. 8 is a sectional view through one of said rollers and its bearing, the shaft on which the roller is mounted appearing in elevation. Fig. 9 is an inverted plan, partly in section, showing the disengaging device in connection with the operating levers which control the direction of rotation of the driven shaft, preventing the operation of both of said levers at the same time.

Referring to the characters of reference, 1 designates the frame of the car or motor vehicle in which is suitably journaled the driving shaft 2 to which rotation is imparted by any suitable explosive engine 3. Fixed to said driving shaft is a driving cone 4. Journaled in the frame below the driving shaft and in parallel relation therewith is the driven shaft 5 which has the usual connection with the rear axle 6 of the vehicle. Fixed to the driven shaft is the cone 7 which is so positioned that the base thereof shall stand opposed to the apex of the cone 4, the peripheries of said cones being out of contact, as shown in Fig. 4. Motion is transmitted from the cone 4 to the cone 7 through the medium of the transmitting friction rollers 8 engaging the peripheries of said cones on opposite sides thereof and mounted upon the inclined shafts 9. Said shafts 9 are rock shafts and are hung upon eccentric journals 10 at the opposite ends thereof, which journals are supported respectively in the bearing plates 11 and 12 at the opposite ends of said shafts. Said bearing plates are freely supported upon the pins 13 projecting from the cross bars 14 of the frame and entering freely the apertures 15 in said bearing plates, as clearly shown in Fig. 5, to afford facility of movement of said plates as the transmitting rollers are carried into contact with the opposite peripheries of the cones, thereby enabling said rollers to engage said cones with equal pressure.

To enable the shafts 9 to be rocked upon their eccentric journals, each is provided with a crank arm 16, to the free ends of which are attached the upper ends of the vertical rods 17, said rods being connected at their lower ends to the crank arms 18 on the transverse rock shaft 19 supported by hangers 20 from the frame. Also mounted on the shaft 19 is a crank arm 21 to which is attached the rod 22 leading to the pedal 23. By a movement of said pedal, the rod 22 is drawn upon to turn the shaft 19, thereby actuating the rods 17 to rock the shafts 19 upon their eccentric journals and swing the rollers 8 into contact with the cones, the arrangement being such as to enable sufficient pressure to be exerted to maintain the rollers in driving contact, thereby transmitting the rotary motion of cone 4 to cone 7.

It will be observed that the point of contact of the rollers 8 with the cones determines the degree of speed imparted to the driven shaft. When the rollers 8 are engaging the apex of cone 4 and the base of cone 7, as shown in Fig. 3, shaft 5 will be driven at a comparatively low rate of speed. As said rollers are moved rearwardly, the degree of speed which is imparted to the driven shaft is increased, until said rollers are caused to engage the base of cone 4 and apex of cone 7 when the maximum speed at which shaft 5 may be driven is attained.

The transmitting rollers 8, as will be seen on referring to Fig. 8, are journaled upon the shafts 9 by means of suitable ball bearings 24 which not only permit of the rotation of said rollers, but which allow the rollers to be freely moved longitudinally of said shafts. Provision is made for sliding the rollers 8 longitudinally of the shafts 9 through the medium of the non-rotative collars 25 which are made in two parts, as shown in Fig. 7, and which are provided with annular flanges 26 that engage in annular channels in the hub members 27 of said rollers, an arrangement which connects the collars to the hub members of the rollers, yet allows said hub members to rotate freely within said collars. The parts of the collars are united by the transverse bolts 28. The upper ends of the actuating rods 29 are pivotally attached to the collars 25, the lower ends of said rods being pivoted to a cross bar 30 to the center of which is pivotally attached one end of a link 31 whose opposite end is pivoted to the lever 32 fulcrumed at 33 on the frame. A rod 34 is pivotally attached at one end of said lever and at the opposite end to a crank arm 35 depending from a rock shaft 36 suitably supported in the frame. One end of the rock shaft 36 extends through the frame and carries thereon the operating lever 37. It will now be understood that through the medium of the lever 37, the lever 32 may be actuated to slide the transmitting rollers 8 longitudinally of the shafts 9 to vary the speed of the driven shaft 5 at will.

To reverse the direction of rotation of the driven shaft for the purpose of driving the vehicle backward, said shaft is provided with a relatively large beveled friction wheel 38 which is fixed thereto and which is adapted to be engaged by a relatively small beveled friction wheel 39 splined upon the driving shaft 2 and normally held from contact with the wheel 38 by means of a coiled spring 40 which is mounted between a fixed collar 41 on said shaft 2 and the side of the wheel 39. The beveled wheel 39 is actuated to carry it into contact with the wheel 38 through the medium of a lever 42 which is fulcrumed at 43 and is provided with a yoke 44 which embraces the hub 45 of the wheel 39, said yoke being provided with pins which engage in the peripheral channel 46 of said hub, as will be well understood in the art. To the free end of the lever 42 is attached an operating rod 47 whose forward end is coupled to the pedal 48. By throwing the pedal forward, the rod 47 will be drawn upon to swing the lever 42 and slide the wheel 39 into contact with the wheel 38, causing the shaft 5 to revolve at a slow speed in a direction opposite to that of shaft 2. Upon releasing the pedal 48, the spring 40 will force the wheel 39 from contact with the wheel 38.

It is evident that provision must be made for preventing the engagement of the reversing friction wheels while the rollers 8 are in engagement with the driving cone to accomplish which a swinging plate 49 (see Fig. 9) is pivoted at 50 to the under side of the forward platform 51 of the car so as to lie between the pedal levers 23 and 48. Upon each of said levers is an inwardly projecting dog 52 adapted to engage in the ratchet 53 with which each of said pedal levers is associated. The pivoted plate 49 is provided with the oppositely inclined shoulders 54 with which the pedal levers are adapted to successively engage when they are pushed forward. With the parts in the position shown in Fig. 9, which position indicates that the transmitting rollers 8 are in engagement with the cones, because of the forward position of lever 23, should the pedal lever 48 be forced forward to reverse the direction of rotation of the shaft 5, such forward movement of said lever 48 will cause it to engage the beveled shoulder 54 on its side of the plate 49 and swing said plate laterally, thereby forcing laterally the pedal lever 23 with which the side of said plate engages, and disengaging the dog of said lever 23 from its ratchet, when the tension of the spring 55 will restore the lever 23 to its neutral position and release the rollers 8 from the cones. In like manner should the pedal lever 23 be thrown forward while the pedal lever 48 is in a forward position, the forward movement of the pedal lever 23 will disengage the lever 48 when the spring 56 will return it to its normal position. By this arrangement it will be evident that the operation necessary to drive the car backward will disengage the mechanism employed in propelling the car forward and vice versa.

Inclosing the cones and transmitting rollers is a suitable case 57 which protects said parts from the elements.

Having thus fully set forth my invention, what I claim as new and desire to secure by Letters Patent, is:—

1. In a frictional transmission mechanism, the combination of the driving and driven shafts in parallel relation, a friction cone upon each of said shafts, said cones being so disposed that the base of one cone stands opposite the apex of the other cone, an eccentrically journaled shaft adjacent to said cones and so positioned as to lie parallel with the opposed faces thereof, the axis of said shaft being inclined with respect to the axes of said parallel shafts, a friction roller mounted upon said shaft to rotate thereon and to slide longitudinally, means for sliding said roller longitudinally of said shaft, and means for rocking the shaft to carry said roller toward and from said cones.

2. In a frictional transmission mechanism, the combination of the driving and driven shafts in parallel relation, a friction cone upon each of said shafts so disposed that the apex of one cone stands opposite the base of the other, a shaft adjacent to and parallel with the opposed faces of said cones, and lying in a plane oblique with respect to said parallel shafts, a transmitting friction roller mounted to rotate upon said shaft and to slide longitudinally thereof, means for sliding said roller longitudinally of said shaft, means for carrying said roller into contact with said cones, means for moving said roller from contact with said cones, and means for reversing the direction of rotation of the driven shaft.

3. In a frictional transmission mechanism, the combination of the driving and driven shafts, a friction cone upon each of said shafts so disposed that the base of one cone stands opposite the apex of the other cone, a shaft adjacent to and parallel with the opposed faces of said cones, a transmitting friction roller mounted to rotate upon said shaft and to slide longitudinally thereof, means for sliding said roller longitudinally of said shaft, means for carrying said roller forcibly into contact with said cones, means for moving said roller from contact with said cones, friction wheels on said parallel shafts one of which is movable, said wheels being adapted to have frictional contact, means for restraining said movable wheel, and means for moving said movable wheel into contact with the other to reverse the direction of rotation of the driven shaft.

4. In a frictional transmission mechanism, the combination of the driving and driven shafts, a friction cone on each of said shafts, said cones being so disposed that the base of one cone stands opposite the apex of the other cone, a rock shaft parallel with the opposed faces of said cones eccentrically mounted, and lying in a plane oblique with respect to said parallel shafts, a transmitting friction roller mounted to rotate upon said shaft and to slide longitudinally thereof, means for sliding said roller longitudinally of said rock shaft, and means for rocking said eccentrically mounted shaft to carry said roller into contact with said cones and from contact therewith.

5. In a frictional transmission mechanism, the combination of the driving and driven shafts, a friction cone upon each of said shafts, said cones being so disposed that the base of one cone stands opposite the apex of the other, a rock shaft upon each side of said cones in parallel relation with the opposed faces thereof, said shafts being eccentrically mounted, a transmitting friction roller on each of said rock shafts mounted to rotate and to slide longitudinally thereof, means for simultaneously sliding said rollers longitudinally of said rock shafts, means for rocking said shafts upon their eccentric bearings to carry said rollers into contact with the peripheries of said cones and from contact therewith, and means for reversing the direction of rotation of the driven shaft.

6. In a frictional transmission mechanism, the combination of the driving and driven shafts, a friction cone upon each of said shafts so disposed that the base of one cone stands opposite the apex of the other, a movably mounted shaft upon each side of said cones parallel with the opposed faces thereof, a transmitting friction roller upon each of said movably mounted shafts, each roller being adapted to rotate upon its shaft and to move longitudinally thereof, means for simultaneously moving said rollers longitudinally of their shafts, and means for simultaneously moving the roller shafts to carry said rollers into contact with the peripheries of said cones, and from contact therewith.

7. In a frictional transmission mechanism, the combination of the driving and driven shafts, a friction cone upon each of said shafts so disposed that the base of one cone stands opposite the apex of the other, bearing plates at the opposite ends of said cones mounted to afford facility of movement, shafts eccentrically mounted at their opposite ends in said bearing plates and standing parallel with the opposed faces of said cones, a transmitting friction roller on each of said eccentrically mounted shafts, said rollers being rotatable upon said shafts and movable longitudinally thereof, means for moving said rollers longitudinally of their shafts, and means for rocking the roller shafts upon their eccentric bearings to carry the rollers simultaneously into contact with said cones and from contact therewith.

8. In a frictional transmission mechanism, the combination of the driving and driven shafts, a friction cone on each of said shafts so disposed that the base of one cone stands opposite the apex of the other, a transmitting friction roller to transmit movement from one cone to the other, said roller being movable longitudinally of said cones and movable into and from contact therewith, means for reversing the direction of rotation of the driven shaft, means for controlling said reversing mechanism, means for moving the transmitting roller into engagement and from engagement with said cones, and means associated with the reversing mechanism and with the means for moving said roller with respect to said cones, whereby the roller is moved from contact with the cones simultaneously with the operation that brings the reversing mechanism into service.

In testimony whereof, I sign this specification in the presence of two witnesses.

ERHARD T. ALBER.

Witnesses:
CONRAD NOLL,
JOHN BAUMGARDNER.